(12) United States Patent
Loden (10) Patent No.: US 7,959,346 B2
(45) Date of Patent: Jun. 14, 2011

(54) DRINK SHAKER HAVING BREAKING PROTRUSIONS

(76) Inventor: Bill Loden, Plano, TX (US)

(*) Notice: Subject to any disclaimer, the term of this patent is extended or adjusted under 35 U.S.C. 154(b) by 147 days.

(21) Appl. No.: 12/371,878

(22) Filed: Feb. 16, 2009

(65) Prior Publication Data

US 2010/0206174 A1    Aug. 19, 2010

(51) Int. Cl.
*A47J 43/27*    (2006.01)
(52) U.S. Cl. .. 366/130; 220/568; 241/168; 241/DIG. 17
(58) Field of Classification Search .......... 366/130; 220/568; 241/168, 169, 169.2, DIG. 17; 215/DIG. 8
See application file for complete search history.

(56) References Cited

U.S. PATENT DOCUMENTS

| | | | | |
|---|---|---|---|---|
| 140,019 A * | 6/1873 | Dixon et al. | | 241/265 |
| 1,251,878 A * | 1/1918 | Fay | | 366/256 |
| 1,532,681 A * | 4/1925 | Bryce | | 222/562 |
| 1,740,223 A * | 12/1929 | Burvenick | | 220/568 |
| 1,765,129 A * | 6/1930 | Cooke | | 220/568 |
| 2,056,097 A * | 9/1936 | Fegley et al. | | 241/199.9 |
| 4,765,549 A * | 8/1988 | Sherman | | 241/169 |
| 5,273,190 A * | 12/1993 | Lund | | 222/83 |
| 2010/0206174 A1* | 8/2010 | Loden | | 99/275 |

* cited by examiner

*Primary Examiner* — Charles E Cooley
(74) *Attorney, Agent, or Firm* — Carr LLP; Theodore F. Shiells (57) ABSTRACT

A beverage mixing vessel or drink shaker has internal features effective for breaking up ice as the beverage mixing vessel or drink shaker is shaken. One or more protrusions disposed near the bottom of a container have apexes aligned in the direction of shaking motion. The impact of ice cubes upon the apexes of the protrusions facilitates breaking the ice cubes into smaller pieces, thereby having the effect of cooling a mixed beverage more quickly.

7 Claims, 7 Drawing Sheets

DRINK SHAKER HAVING BREAKING PROTRUSIONS

BACKGROUND OF THE INVENTION

1. Field of the Invention

The present invention relates to drink shakers and, more particularly, to a drink shaker having particular features for breaking-up ice cubes.

2. Description of the Related Art

Certain alcoholic beverages, such as the martini cocktail, may be prepared by combining liquid ingredients, such as gin or vodka and vermouth, in a mixing glass or drink shaker with a quantity of ice cubes. Martini purists are reputed to advocate keeping the liquid ingredients and the mixing glass at room temperature prior to mixing, so that a small quantity of cold water is diluted into the drink when the ingredients are stirred with ice. The infusion of water is believed to enhance the flavor of the ingredients and improve the subjective experience of the drink. Although the classic martini cocktail was stirred, many contemporary martini enthusiasts prefer their drink shaken, not stirred.

A shaken martini is believed to be different from a stirred martini for a few reasons. The shaking action tends to break up the ice and add more water to the drink, slightly weakening the drink but also altering its taste. Some would say the shaken martini has a "more rounded" taste. Others, citing obscure scientific studies, say that shaking causes more of a certain class of molecules (aldehydes) to bond with oxygen, resulting in a "sharper" taste. Some martini devotees believe the vermouth is more evenly distributed by shaking, which can alter the flavor and texture of the beverage as well. Recent medical research has shown that shaken martinis have a slightly higher antioxidant level than those stirred, although the exact mechanism for this was not derived.

The shaken martini cocktail has become quite popular in recent years. Enclosed beverage mixing vessels or drink shakers are commonly known, and provide means for mixing the ingredients without spillage by shaking the enclosed vessel. Motorized countertop devices have been provided for receiving an enclosed mixing vessel and shaking the vessel via a motorized mechanism. However, the shaking action by itself is ineffective to break up ice cubes such as typically made in home freezer ice cube tray.

SUMMARY OF THE INVENTION

The present invention provides a beverage mixing vessel or drink shaker having internal features effective for breaking up ice as the beverage mixing vessel or drink shaker is shaken.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details or with variations therein.

Figure 1:
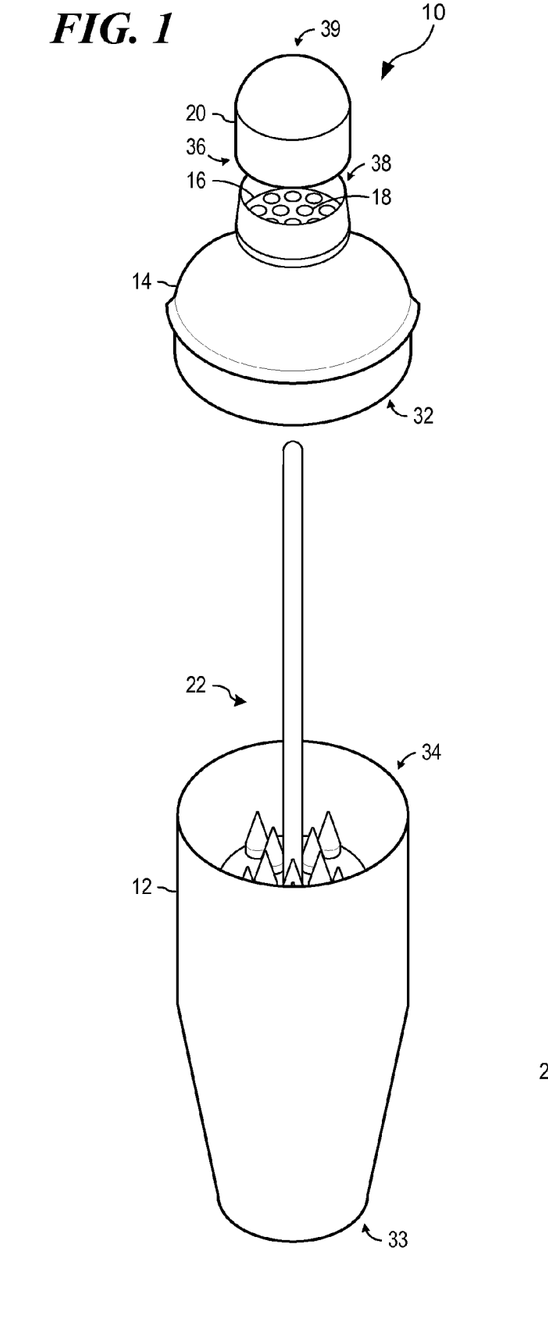
FIG. 1 is a perspective view showing a beverage mixing vessel or drink shaker disassembled in accordance with an aspect of the present invention.

Turning now to FIG. 1, the reference numeral 10 generally indicates a beverage mixing vessel or drink shaker in accordance with an embodiment of the present invention. The drink shaker 10 can comprise a container 12, which may be of a generally cylindrical configuration, like a "tumbler", having a closed end 33 at the bottom thereof and an open end 34 at the top thereof. The drink shaker 10 can further comprise a first removable cap 14 having a large open end 32 at the bottom thereof and a smaller open end 38 at the top thereof. A strainer 16 can be fitted to the first removable cap 14 across the smaller open end 38, and be provided with a plurality of holes 18 for permitting the mixed drink to be poured from the drink shaker 10 into a drinking glass. The first removable cap 14 can be configured such that its large open end 32 fits over the open end 34 of container 12. The drink shaker can further comprise a second removable cap 20 having an open end 36 at the bottom thereof and a closed end 39 at the top thereof. The second removable cap 20 can be configured such that its open end 36 fits over the small open end 38 of first removable cap 14. The drink shaker 10 can further comprise a removable ice breaking device 22 configured to fit within container 12 with the first removable cap 14 in place.

Figure 2:
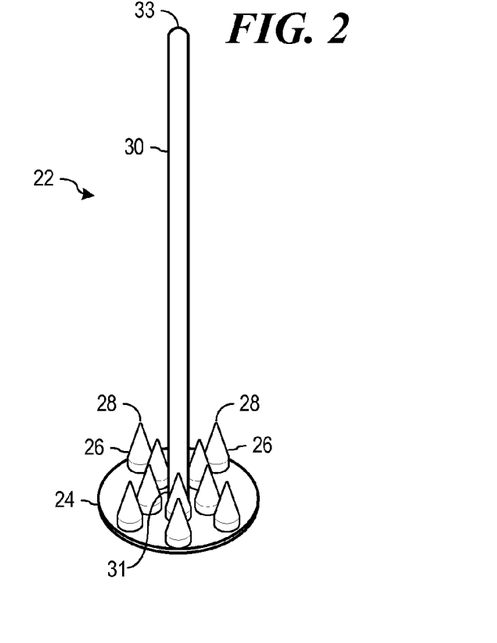
FIG. 2 is a perspective view showing an ice breaking device in accordance with an aspect of the present invention.

Turning now to FIG. 2, the reference numeral 22 generally indicates a removable ice breaking device having features effective for breaking up ice as the beverage mixing vessel 10 is shaken. In an embodiment, the ice breaking device 22 comprises a support member such as base plate 24 and one or more generally pointed or conical protrusions 26 rising from a top side of the base plate 24, each of said protrusions having an apex 28 generally aligned with a direction of motion when shaking the mixing vessel 10. For example, in the embodiment shown, the direction of motion when shaking is presumed to be vertical, or up-and-down, and therefore the apex 28 of protrusion 26 is aligned with the vertical direction, which is to say that the apex 28 points upwards in the embodiment shown. The ice breaking device 22 further comprises an elongated restraining member 30 coupled to the base plate 24, wherein the restraining member 30 may be in the form of an elongated rod having a first end 31 coupled to the base plate 24, and having a second end 33 distal from the base plate 24. In other embodiments, the protrusions may have other shapes, such as generally pyramidal, wherein the protrusions have apices aligned with a direction of motion when shaking the mixing vessel or drink shaker 10. In various embodiments, the protrusions 26 may be mechanically coupled to the base plate 24, or may be formed integrally therein. In various embodiments, the restraining member 30 may be mechanically coupled to the base plate 24, or may be formed integrally therein.

Figure 3:
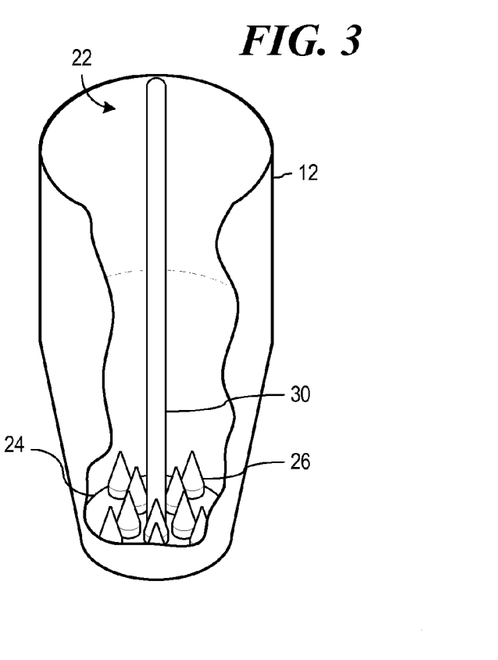
FIG. 3 is a partial cutaway view of a container portion of a drink shaker showing the ice breaking device disposed therein.

Turning now to FIG. 3, the ice breaking device 22 may be placed within the container 12 such that the base plate 24 is disposed at the bottom of container 12 with the protrusions 26 and the elongated restraining member 30 pointing upward, aligned with the direction of motion when shaking.

Figure 4:
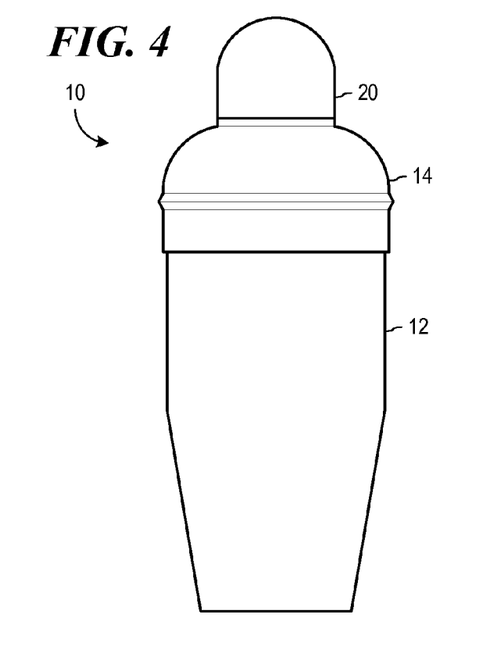
FIG. 4 shows an elevation of a beverage mixing vessel or drink shaker assembled.
Figure 5:
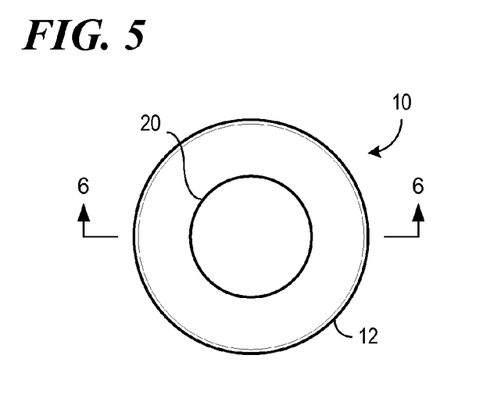
FIG. 5 shows a plan view of a beverage mixing vessel or drink shaker assembled.
Figure 6:
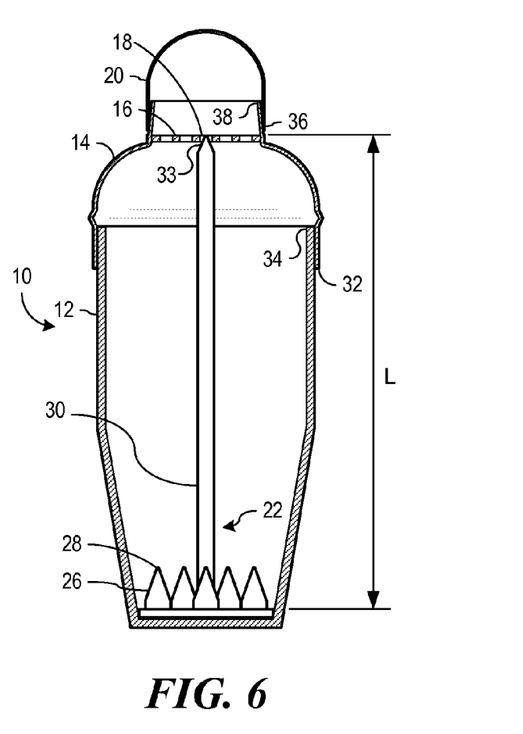
FIG. 6 is a partial cross sectional view taken along the lines 6-6 in FIG. 5, showing the disposition of the ice breaking device within the assembled drink shaker.

Turning now to FIGS. 4-6, the drink shaker 10 is shown in an assembled configuration wherein the first removable cap 14 is placed atop the container 12 and the second removable cap 20 is placed atop first removable cap 14. As shown in the partial cutaway view in FIG. 6, taken along the lines 6-6 in FIG. 5, the large open end 32 of first removable cap 14 fits snuggly over the open end 34 of container 12, and the open end 36 of second removable cap 20 fits snuggly over the small open end 38 of first removable cap 14, thereby making a substantially water-tight closure of the drink shaker 10. The ice breaking device 22 may be disposed within the container 12 such that the base plate 24 is disposed at the bottom of container 12 with the protrusions 26 and the elongated restraining member 30 pointing generally upward, generally aligned with the direction of motion when shaking. The elongated restraining member 30 may extend a predetermined length L such that the second end 33 distal from base plate 24 makes contact with the strainer 16 in first removable cap 14 to restrain motion of ice breaking device 22 within container 12 while shaking the drink shaker 10. In an embodiment, the second end 33 may be configured to have a particular shape adapted for engaging at least one of the holes 18 formed in strainer 16, such as a tapered shape as shown in FIG. 6. In other embodiments, the second end 33 may be configured to have other shapes, such as rounded, flat, conical, pyramidal, or any other shape suitable for engaging one or more features of removable cap 14 to restrain motion of ice breaking device 22 within container 12 while shaking the drink shaker 10.

Figure 7:
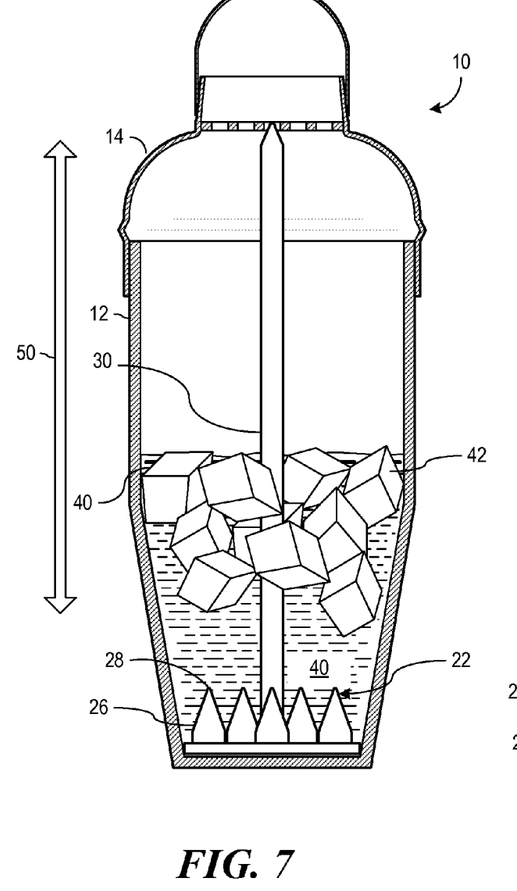
FIG. 7 is a partial cross sectional view of the drink shaker showing a liquid beverage mixture and ice cubes disposed within the drink shaker at rest.
Figure 8:
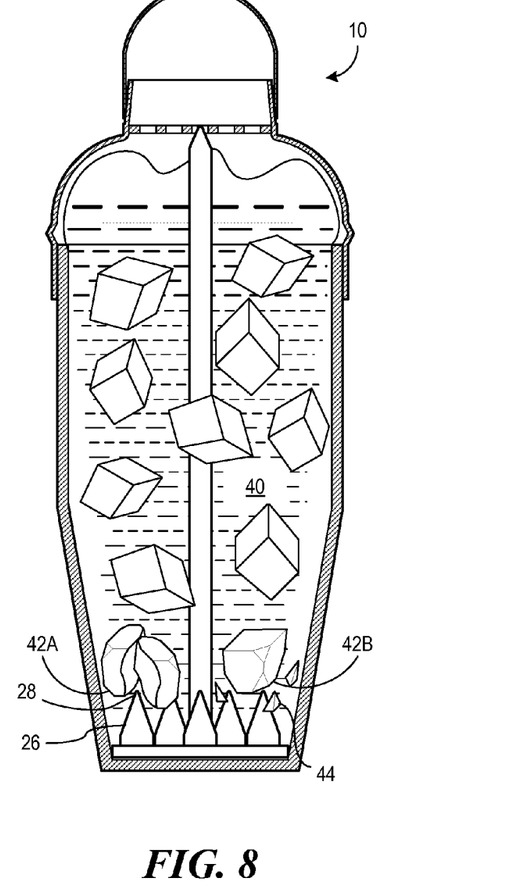
FIG. 8 is a partial cross sectional view of the drink shaker showing a liquid beverage mixture and ice cubes disposed within the drink shaker in motion.

Turning now to FIG. 7, drink shaker 10 is shown in an assembled configuration as described above, now having a liquid mixture 40 of beverage ingredients combined therein with one or more ice cubes 42 floating near the top of the liquid mixture 42. As the drink shaker 10 is shaken up and down in the directions indicated by arrow 50, the liquid mixture 40 becomes distributed throughout the interior of the closed drink shaker 10, as depicted in FIG. 8, and the ice cubes 42 travel back and forth between the top and the bottom of the interior of the drink shaker 10. As the ice cubes 42 hit the bottom of the container 12, and make impact with the apexes 28 of protrusions 26, the ice cubes 42 may break into relatively large pieces, as shown by ice cube 42A, or may have relatively small chips 44 broken off the corners as shown by ice cube 42B.

Figure 9A:
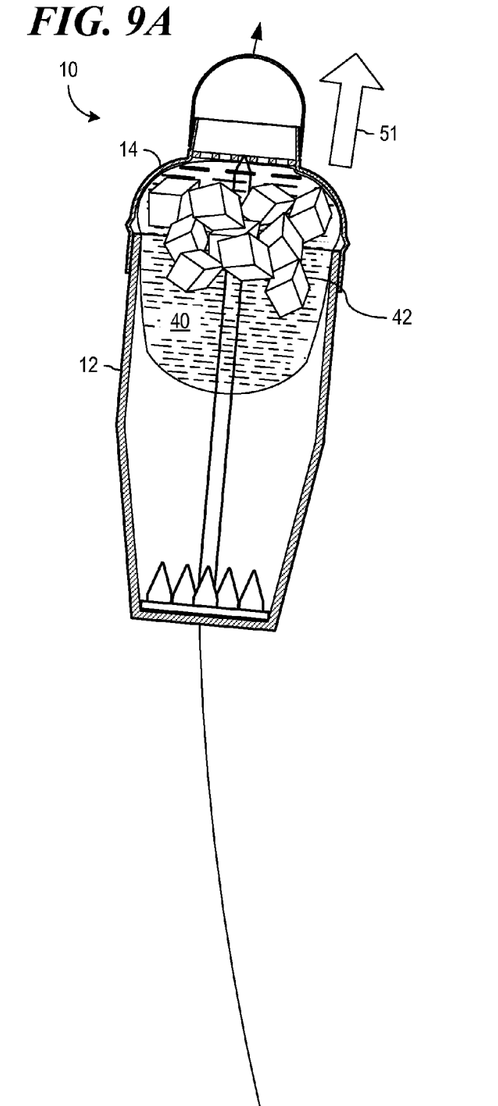
FIGS. 9A-9B are partial cross sectional views of the drink shaker showing a liquid beverage mixture and ice cubes disposed within the drink shaker at upper and lower extents of travel, respectively.
Figure 9B:
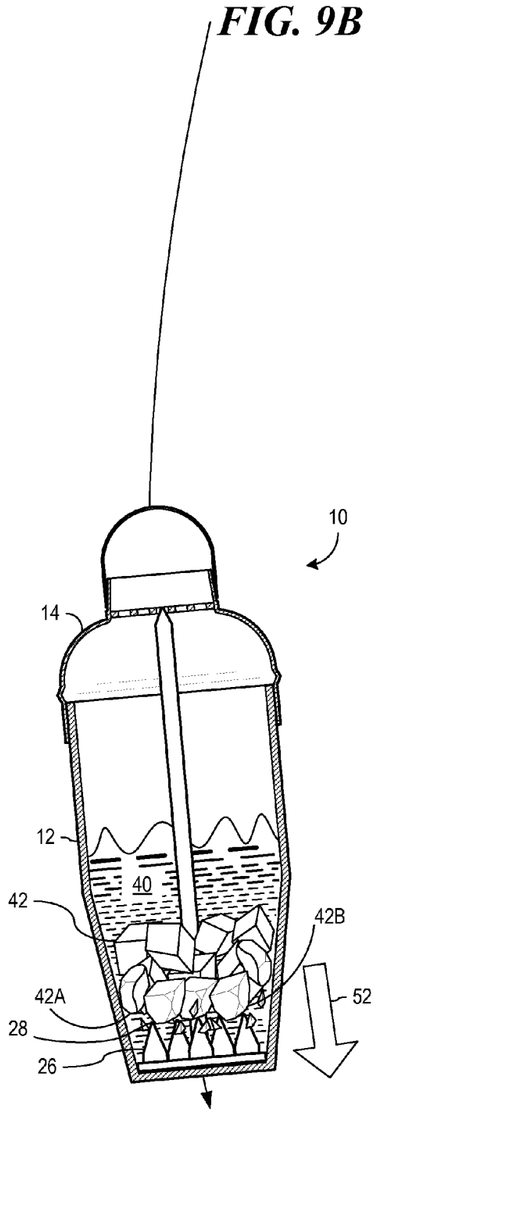

Turning now to FIGS. 9A-9B, the drink shaker 10 may be shaken up and down in directions indicated by arrows 51 and 52. As shown in FIG. 9A, as drink shaker 10 reaches an upper limit of travel and stops momentarily in preparation for downward travel, the liquid mixture 40 and the ice cubes 42 may be disposed near the top of the drink shaker 10, within a volume enclosed by the first removable cap 14 and the upper portion of container 12. Although not depicted in the drawing, it is understood that some of the liquid mixture 40 may pass through the strainer 16 and into the volume enclosed within the second removable cap 20. As shown in FIG. 9B, as drink shaker 10 reaches a lower limit of travel and stops momentarily in preparation for upward travel, the liquid mixture 40 and the ice cubes 42 may be disposed near the bottom of the drink shaker 10, within a volume enclosed by the lower portion of container 12. The impact of ice cubes 42 upon apices 28 of protrusions 26 is believed to facilitate breaking the ice cubes 42 into smaller pieces, thereby having the effect of making ice chips, cooling the liquid mixture 40 more quickly and keeping it cooler longer but not excessively watered down. It will be understood that the shaking action can be accomplished manually, holding the drink shaker 10 in one or both hands, or the shaking action can be accomplished mechanically, placing the drink shaker 10 in a motorized drink shaking apparatus. It will further be understood that the shaking happens quickly without perceptible pauses between upwards and downwards motion.

Figure 10:
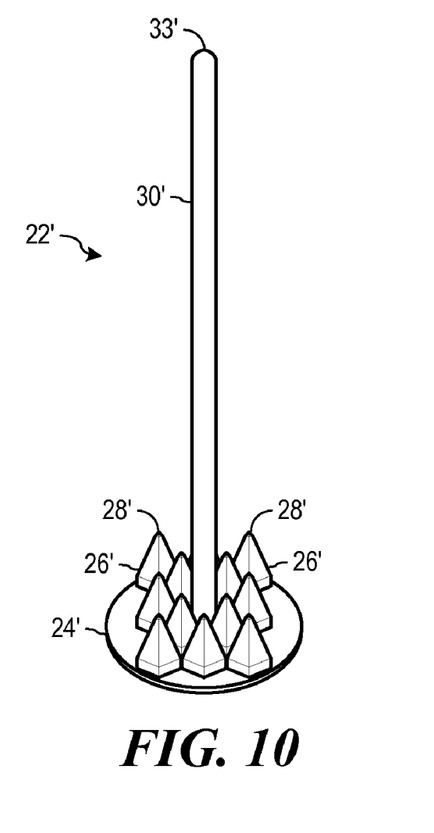
FIG. 10 is a perspective view showing an ice breaking device in accordance with an aspect of the present invention.

Turning now to FIG. 10, an embodiment of an ice breaking device 22' is shown having features effective for breaking up ice as the drink shaker 10 is shaken. In this embodiment, ice breaking device 22' comprises a base plate 24' and one or more protrusions 26' having generally pyramidal shapes rising from a top side of the base plate 24', each of said protrusions having an apex 28' generally aligned with a direction of motion when shaking the mixing vessel 10. In an embodiment, the protrusions 26' may be formed separately and mechanically coupled to the base plate 24'. In another embodiment, the protrusions 26' may be formed integrally in the base plate 24'.

Figure 11:
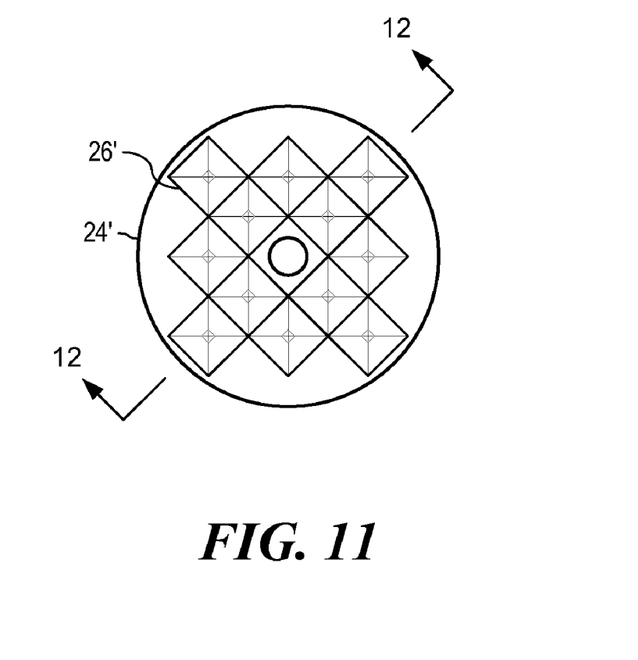
FIG. 11 is a plan view of the ice breaking device shown in FIG. 10.
Figure 12:
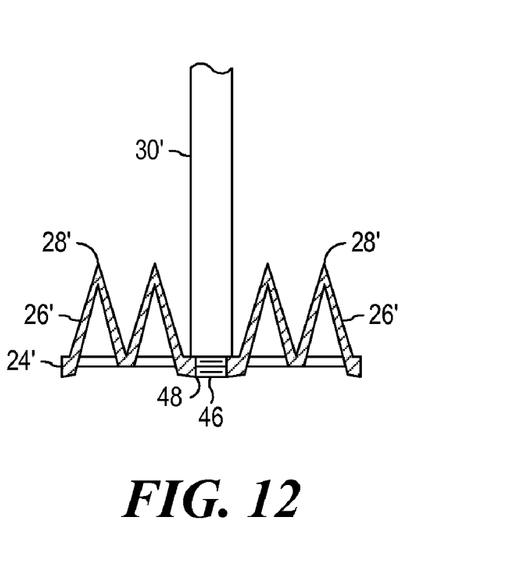
FIG. 12 is a partial cross sectional view taken along the lines 12-12 in FIG. 10, showing the construction of the ice breaking device.

Turning now to FIG. 11, a base plate 24' is shown in a plan view, illustrating an array of protrusions 26' distributed over the top side of the base plate 24'. As shown in a partial cutaway view in FIG. 12, taken along the lines 12-12, protrusions 26' may be formed integrally with base plate 26'. The protrusions 26' may be stamped, cast, or otherwise formed in the base plate 26' such that the apices 28' point upwards. The elongated restraining member 30' may be coupled to the base plate 26' by means of a mechanical coupling such as a threaded end 46 screwed into a threaded hole 48 formed in the base plate 26'. It will be understood that other means of mechanical coupling may be utilized in the alternative. In other embodiments, the restraining member 30' may be formed integrally with the base plate 26'.

Figure 13:
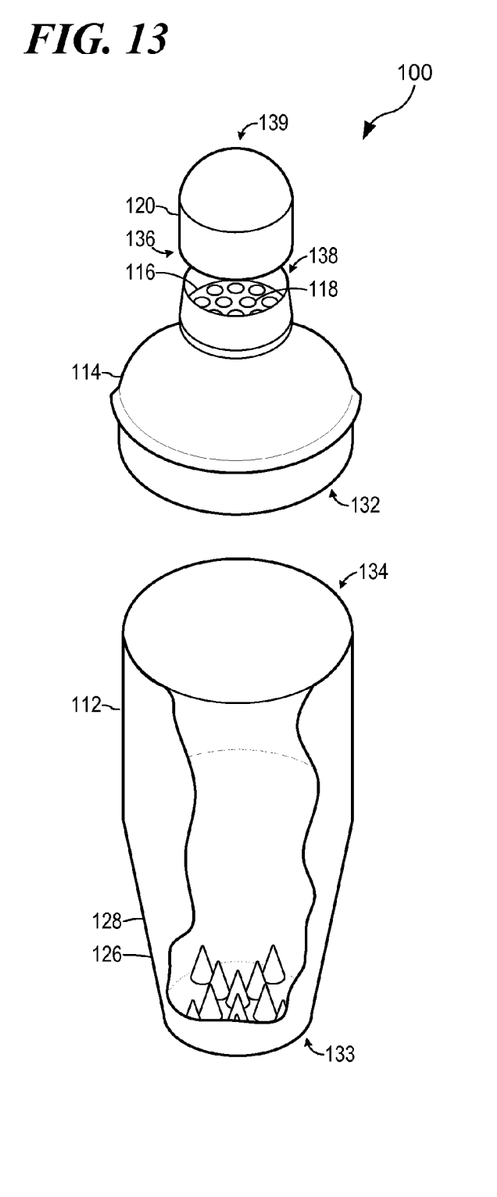
FIG. 13 is a perspective view showing a beverage mixing vessel or drink shaker disassembled in accordance with an aspect of the present invention.
Figure 14:
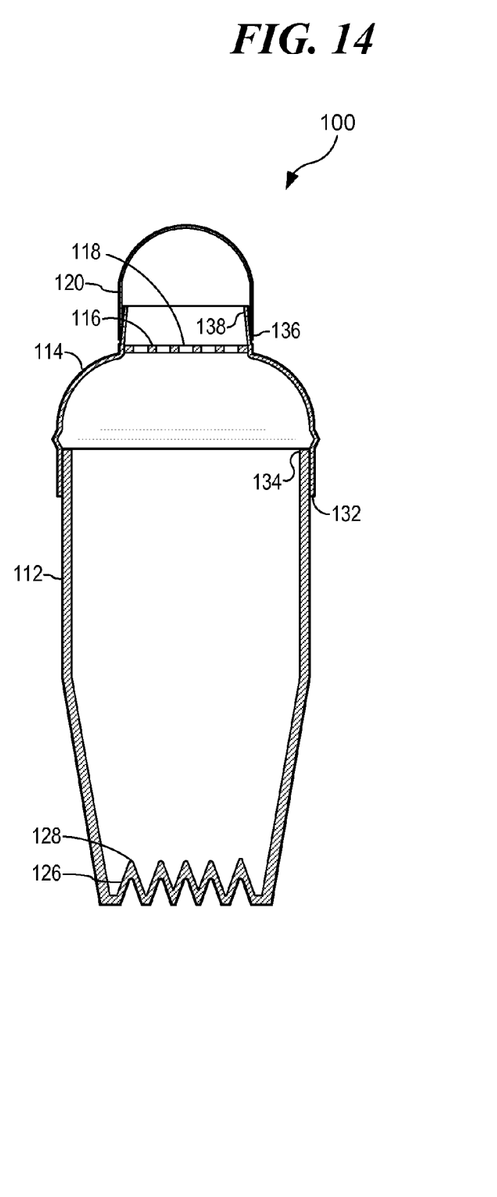
FIG. 14 is a cross sectional view of an embodiment of beverage mixing vessel or drink shaker having non-removable ice breaking features built-in to the bottom of the drink shaker.

Turning now to FIGS. 13-14, the reference numeral 100 generally indicates a beverage mixing vessel or drink shaker in accordance with another embodiment of the present invention. The drink shaker 100 comprises a container 102, which may be of a generally cylindrical configuration, like a "tumbler", having a closed end 133 at the bottom thereof and an open end 134 at the top thereof. One or more protrusions 126 rising from a top side of the closed end 133 of container 112 have apices 128 generally aligned with a direction of motion when shaking the mixing vessel 100. In the embodiment depicted in FIGS. 13-14, the protrusions 126 are integrally formed in, or otherwise permanently attached to, to the top side of the closed end 133 of the container 112 so that the protrusions 126 are fixed in place. Because the protrusions are fixed in place, there is no need for the restraining member 30' that positions plate 24' having protrusions 26' thereon that is used in the embodiment depicted in FIGS. 10-12, for example. The drink shaker 100 further comprises a first removable cap 104 having a large open end 132 at the bottom thereof and a smaller open end 138 at the top thereof. A strainer 116 is fitted to the first removable cap 114 across the smaller open end 138, and is provided with a plurality of holes 118 for permitting the mixed drink to be poured from the drink shaker 100 into a drinking glass. The first removable cap 114 is configured such that its large open end 132 fits over the open end 134 of container 112. The drink shaker further comprises a second removable cap 120 having an open end 136 at the bottom thereof and a closed end 139 at the top thereof. The second removable cap 120 is configured such that its open end 136 fits over the small open end 138 of first removable cap 114.

Figure 15A:
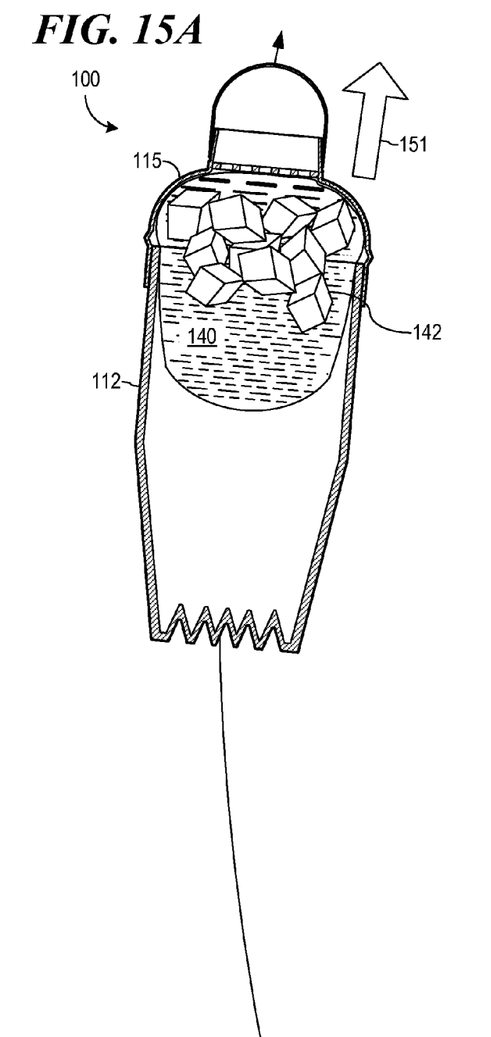
FIGS. 15A-15B are cross sectional views of the drink shaker of FIG. 14 having a liquid beverage mixture and ice cubes disposed within the drink shaker at upper and lower extents of travel, respectively, during shaking.
Figure 15B:
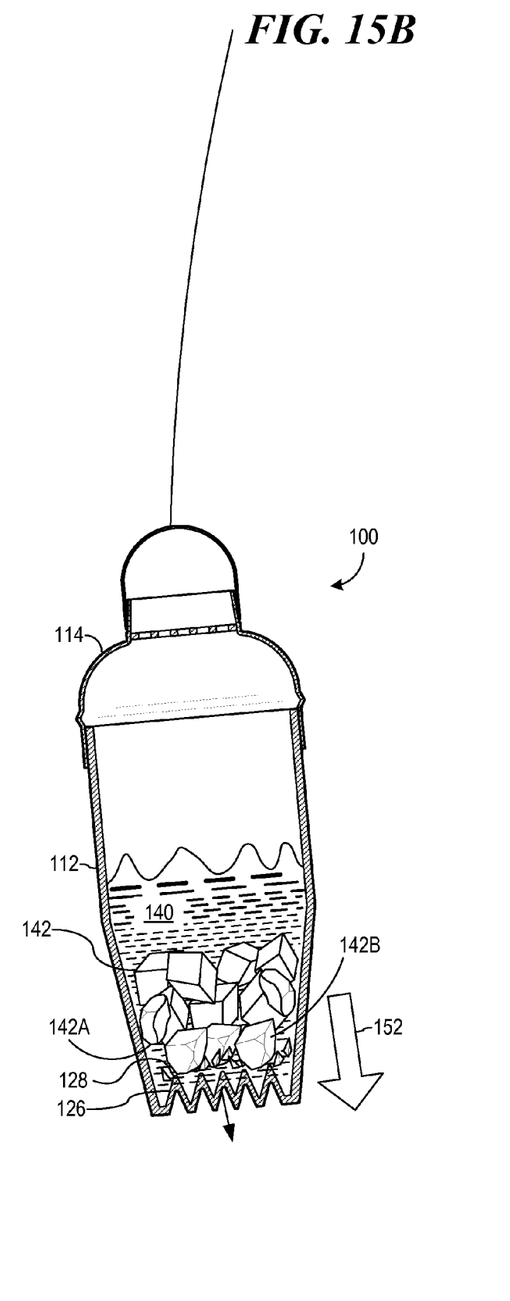

Turning now to FIGS. 15A-15B, the drink shaker 100 may be shaken up and down in directions indicated by arrows 151 and 152. As shown in FIG. 15A, as drink shaker 100 reaches an upper limit of travel and stops momentarily in preparation for downward travel, the liquid mixture 140 and the ice cubes 142 may be disposed near the top of the drink shaker 100, within a volume enclosed by the first removable cap 114 and the upper portion of container 112. Although not depicted in the drawing, it is understood that some of the liquid mixture 140 may pass through the strainer 116 and into the volume enclosed within the second removable cap 120. As shown in FIG. 15B, as drink shaker 100 reaches a lower limit of travel and stops momentarily in preparation for upward travel, the liquid mixture 140 and the ice cubes 142 may be disposed near the bottom of the drink shaker 100, within a volume enclosed by the lower portion of container 112. The impact of ice cubes 142 upon apices 128 of protrusions 126 is believed to facilitate breaking the ice cubes 142 into smaller pieces, thereby having the effect of making ice chips, cooling the liquid mixture 140 more quickly and keeping it cooler longer but not excessively watered down. It will be understood that the shaking action can be accomplished manually, holding the drink shaker 100 in one or both hands, or the shaking action can be accomplished mechanically, placing the drink shaker 100 in a motorized drink shaking apparatus. It will further be understood that the shaking happens quickly without perceptible pauses between upwards and downwards motion.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A beverage mixing vessel, comprising:
    a container having a closed end and an open end;
    a first removable cap having an inlet portion adapted to fit over the open end of the container, the first removable cap having an outlet portion with a strainer disposed therein;
    a second removable cap having an open end and a closed end, the open end of the second cap being adapted to fit over the outlet portion of the first cap; and
    at least one ice-breaking device disposed within the container, comprising one or more protrusions extending upwards from the closed end of the container, the one or more protrusions each having an apex aligned with a direction of motion
    wherein the ice-breaking device comprises:
        a) a support member,
        b) a restraining member extending from the support member,
            i) wherein the one or more protrusions extend from the support member, and
            ii) wherein the ice-breaking device is disposed near the closed end of the container, and in a constant proximity thereto.

2. The beverage mixing vessel of claim 1, wherein the protrusions are generally conical.

3. The beverage mixing vessel of claim 1, wherein the protrusions are generally pyramidal in shape.

4. The beverage mixing vessel of claim 1, wherein the protrusions are formed integrally with the support member.

5. The beverage mixing vessel of claim 1, wherein the protrusions are mechanically coupled to the support member.

6. The beverage mixing vessel of claim 1, wherein the restraining member comprises an elongated rod.

7. The beverage mixing vessel of claim 1, wherein the restraining member is mechanically coupled to the support member.

* * * * *